(12) United States Patent
Gjoni et al.

(10) Patent No.: US 9,811,995 B2
(45) Date of Patent: Nov. 7, 2017

(54) BABY ON BOARD REMINDER

(71) Applicant: Continental Automotive Systems, Inc., Auburn Hills, MI (US)

(72) Inventors: Ermal Gjoni, Sterling Heights, MI (US); Marjan Deljosevic, Shelby Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/985,651

(22) Filed: Dec. 31, 2015

(65) Prior Publication Data

US 2017/0190287 A1    Jul. 6, 2017

(51) Int. Cl.
| | |
|---|---|
| *B60Q 1/00* | (2006.01) |
| *G08B 21/22* | (2006.01) |
| *B60N 2/00* | (2006.01) |

(52) U.S. Cl.
CPC ............. *G08B 21/22* (2013.01); *B60N 2/002* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,284,041 | B2 * | 10/2012 | Cuddihy ................ | B60N 2/002 340/457 |
| 2002/0121969 | A1 * | 9/2002 | Joao ..................... | B60R 25/018 340/425.5 |
| 2007/0268119 | A1 * | 11/2007 | Cram ...................... | B60Q 9/00 340/457 |
| 2009/0212955 | A1 * | 8/2009 | Schoenberg .......... | B60N 2/002 340/573.1 |
| 2011/0285524 | A1 * | 11/2011 | Qian .................... | B60K 28/066 340/457 |
| 2016/0165932 | A1 * | 6/2016 | Armentrout ............ | A23B 9/18 426/271 |

* cited by examiner

*Primary Examiner* — Travis Hunnings

(57) ABSTRACT

An instrument panel interaction system for an automotive vehicle is provided that includes an alerting device configured to produce an alert. A controller is controllably coupled to the alerting device, the controller being operable to activate the alerting device to produce the alert. An inquiring device is communicatively coupled to the controller. The inquiring device is configured to ask the driver whether a child is present. The controller is configured to activate the alerting device to produce the alert when a predetermined condition is met and an affirmative response has been received that a child is present. A method of reminding a driver of the presence of a child within a motor vehicle is also provided.

4 Claims, 4 Drawing Sheets

BABY ON BOARD REMINDER

TECHNICAL FIELD

The present disclosure relates to automotive vehicles, and more particularly to systems, methods, and devices for reminding drivers of the presence of a child on board the vehicle.

BACKGROUND

In recent years, a disturbing phenomenon has occurred when parents have apparently forgotten about the presence of an infant or young child, and have left the infant or young child in a parked vehicle, only to find later that the child has died within the vehicle. Perhaps the driver is distracted by cell phone calls or increasing demands including many things to remember. In any event, though such an occurrence may be relatively rare, the outcome is very tragic.

Accordingly, there is a desire for a way to prevent the driver from forgetting about a child within a vehicle without adding complexity and great cost, given the rarity of such occurrences and the fact that some drivers never travel with children.

SUMMARY

Disclosed are a system, controller, and method of reminding a driver about the presence of a child, that uses existing hardware (to defray cost and complexity) to alert the driver about the presence of a child in a vehicle after a vehicle is parked. The system and method asks the driver if a child is present, and it can be reconfigured to refrain from asking this, if the driver does not normally travel with a child or children. Thus, the system is a cost-effective way to alert a driver without adding much cost and complexity to the vehicle systems.

In one example, which may be combined with or separate from other examples described herein, there is contemplated a child-on-board alerting system for an automotive vehicle. The child-on-board alerting system includes an alerting device configured to produce an alert. A controller is controllably coupled to the alerting device. The controller is operable to activate the alerting device to produce the alert. An inquiring device is communicatively coupled to the controller. The inquiring device is configured to ask the driver whether a child is present. The controller is configured to activate the alerting device to produce the alert when a predetermined condition is met and the controller has received an affirmative response to the inquiring device.

In another example, which may be combined with or separate from the other examples disclosed herein, a controller for implementing a child-on-board reminder system in a motor vehicle is provided. The controller includes a first control logic configured to ask a driver whether a child is present in the vehicle; a second control logic configured to determine whether a predetermined condition has been met that matches a profile defined as a child being left in a vehicle; and a third control logic configured to activate an alerting device when the predetermined condition has been met and the controller has received an affirmative response to the first control logic.

In still another form, which may be combined with or separate from the other forms disclosed herein, a method of reminding a driver of the presence of a child within a motor vehicle is provided. The method includes a step of asking the driver whether a child is present and a step of determining whether an affirmative response has been received that a child is present. The method further includes steps of determining whether a predetermined condition has been met, and producing an alert when the predetermined condition has been met and the affirmative response has been received that a child is present.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the invention, its application, or uses.

Figure 1:
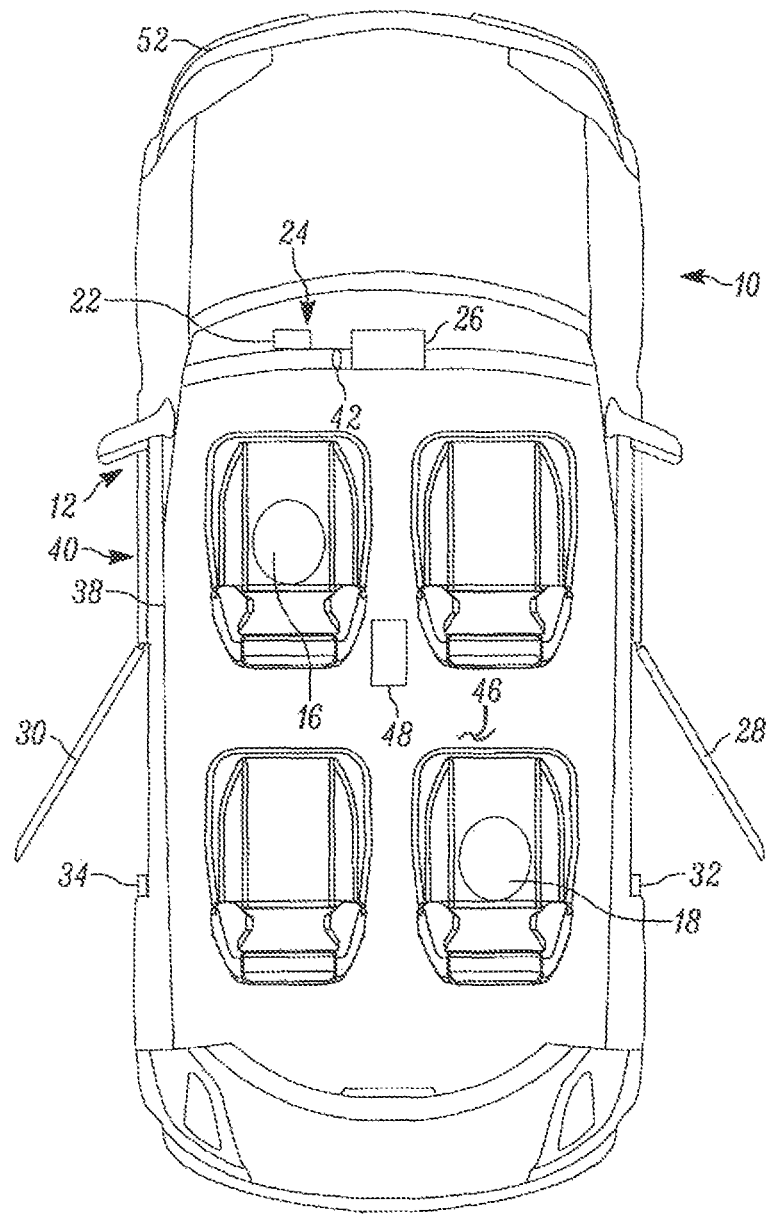
FIG. 1 is a schematic top view of a vehicle including a child-on-board alerting system for an automotive vehicle, in accordance with the principles of the present disclosure.

FIG. 1 illustrates an automotive motor vehicle 10 having a child-on-board alerting system 12 for alerting a driver when and if a child is left behind in the vehicle 10.

Figure 2:
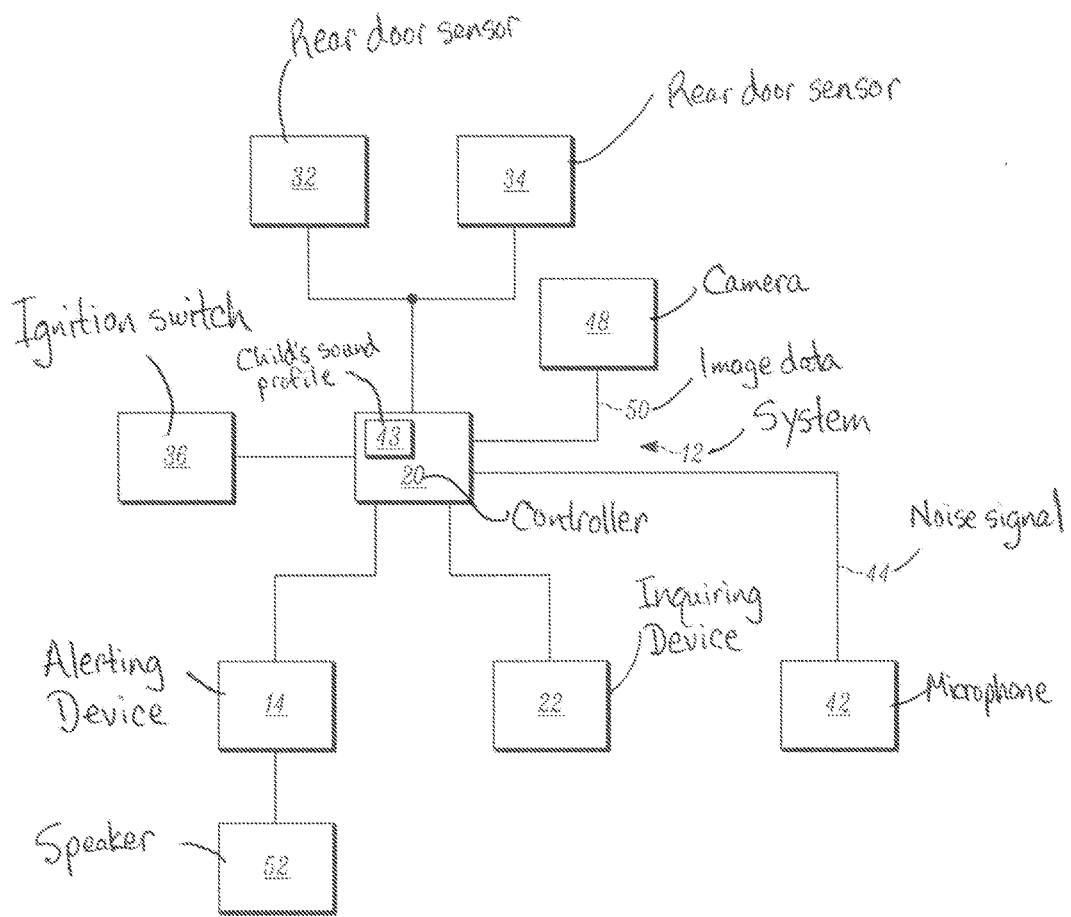
FIG. 2 is a block diagram illustrating a control system for controlling the child-on-board alerting system shown in FIG. 1, according to the principles of the present disclosure.
Figure 3:
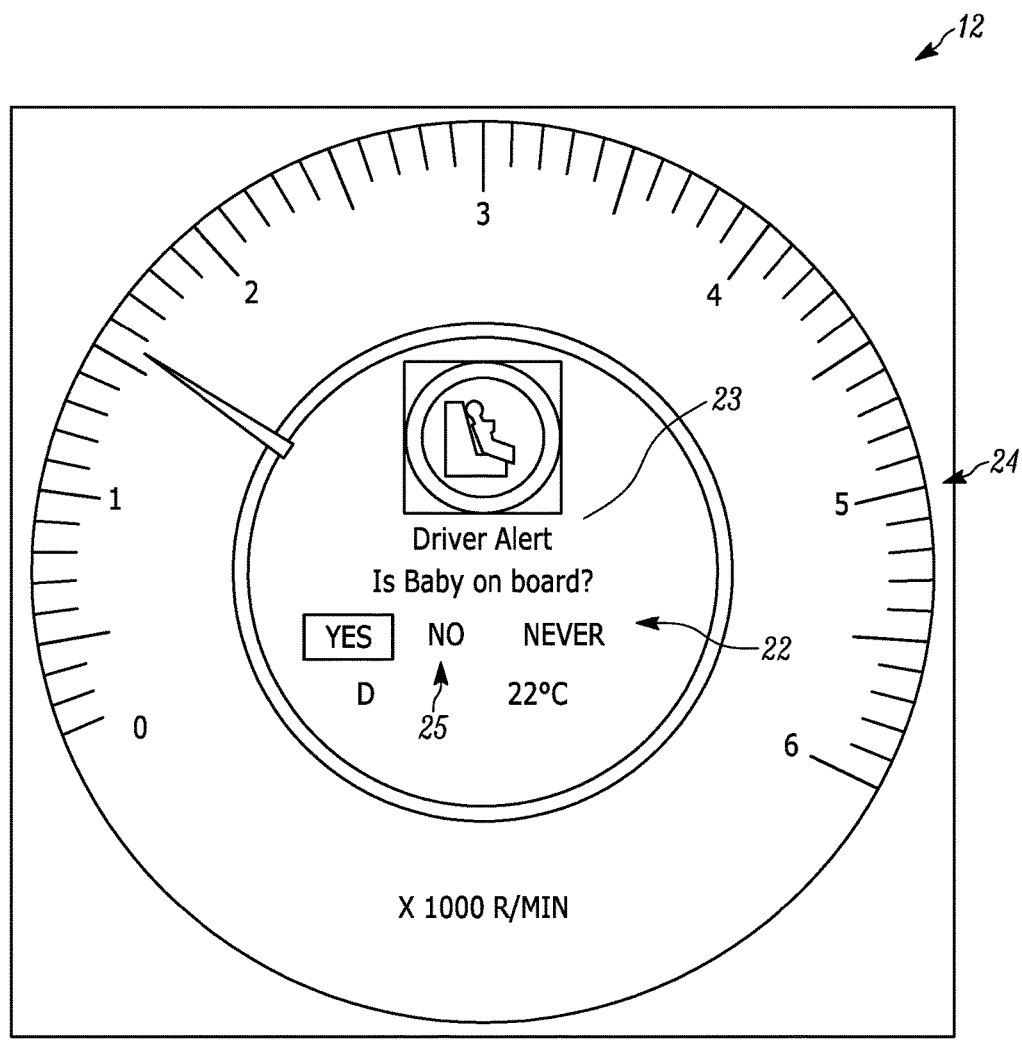
FIG. 3 is a front view showing an inquiring device for use with the system shown in FIGS. 1-2, according to the principles of the present disclosure.

Referring to FIGS. 1-3, the system 12 has an alerting device 14, which is configured to alert the driver 16. The alerting device 14 may take on a variety of different forms, without falling beyond the spirit and scope of the present disclosure. For example, the alerting device 14 could include alarm noises, flashing lights on the exterior and/or interior of the vehicle, a cell phone or app activated through the system 12, a telemetric system within the vehicle 10 that is configured to call the driver 16, emergency responders, and/or police, and/or noises from within the vehicle 10 or an audio message being projected out of the vehicle 10. The alerting device 14 or devices 14 are used to alert the driver 16, or passersby/emergency responders/police, that a child 18 has been left behind in the vehicle 10, which will be explained in further detail below.

The system 12 includes a controller 20 controllably coupled to the alerting device 14. The controller 20 is operable to activate the alerting device 14 to produce one or more alerts, such as those explained above. In some variations, the controller 20 may comprise a control system including more than one controller, by way of example.

An inquiring device 22 is communicatively coupled to the controller 20. The inquiring device 22 is configured to ask the driver whether a child is present. Thus, the controller 20 may include control logic configured to ask a driver whether a child 18 is present in the vehicle 10.

For example, the inquiring device 22 shown in FIG. 3 asks: "Is baby on board?" In the example shown in FIG. 3, the inquiring device 22 is part of an interactive display screen 23 on an instrument cluster 24. It should be understood, however, that the inquiring device 22 could take on any other suitable form, such as an audio inquiring device.

The display screen 23 may be a touch screen to allow the driver 16 to respond by touch, by way of example, or the inquiring device 22 may be responded to with nearby buttons, in some cases. Referring to FIG. 3, the driver 16 may select a response 25, such as "Yes," "No," or "Never." If "Never" is selected, the system 12 may go into the "never ask" mode, which is explained below. If "yes," is selected, however, the system 12 then monitors the vehicle 10 to determine whether the predetermined condition for activating the alerting device 14 is met. If "no," is selected, then the system 12 does not activate the alerting device 14.

The display screen 23 could be a digital electronic display, such as a liquid crystal display (LCD) (which may be back lit by LEDs), an organic light-emitting diode (OLED) display, a thin film transistor (TFT) display, or a picture generation unit (PGU) such as the type used in head-up displays, having a projector and a lens, by way of example. The inquiring device 22 could be part of a HUD system. Instead of being located on the instrument cluster 24, the display screen 23 or other inquiring device 22 could be located on the center stack display 26, in some variations.

The inquiring device 22 may be reconfigurable between the following modes: an "always ask" mode wherein the inquiring device 22 is configured to ask whether a child is present upon turning on the vehicle 10; a "sensor ask" mode wherein the inquiring device 22 is configured to ask whether a child is present when one of the rear doors 28, 30 is opened, in a start-up predetermined time frame, prior to opening a front door 38 or prior to starting the vehicle 10 or engaging a driver gear of the vehicle; and a "never ask" mode wherein the inquiring device 22 is configured to refrain from asking whether a child is present.

More particularly, in the "always ask" mode, the controller 20 causes the inquiring device 22 to ask if a child is present after the ignition switch 36 is turned on.

In the "sensor ask" mode, the controller 20 determines whether one of the rear doors 28, 30 has been opened, as detected by a rear door sensor 32, 34, prior to either: opening the front door 38 of the driver's side 40 of the vehicle 10, or starting the vehicle 10, or engaging a drive gear of the vehicle. This is preferably determined in a start-up predetermined time frame, for example, within 10 minutes of turning on the ignition switch 36 of the vehicle. Thus, if during the start-up predetermined time frame, one of the rear doors 28, 30 is opened and then subsequently, the front door 38 is opened, the vehicle 10 is started, or a drive gear of the vehicle 10 is engaged, the system 12 and/or controller 20 registers that a child may be present, and the controller 20 causes the inquiring device 22 to ask whether a child 18 is present. Accordingly, the controller 20 may have a control logic configured to determine whether a rear door 28, 30 has been opened prior to opening a front door 38 and starting the vehicle 10, in a start-up predetermined time frame.

In the "never ask" mode, the system 12 has been configured to refrain from having the inquiring device 22 ask whether a child is present, because, for example, the driver 16 may have no children and not want to be bothered with the question.

The controller 20 is programmed and configured to activate the alerting device 14 to produce the alert when an affirmative response has been given that a child is present and when a predetermined condition is met. The controller 20 may include a control logic configured to activate the alerting device 14 when the predetermined condition has been met and the controller has received an affirmative response. Thus, part of the requirement for activating the alerting device 14 can include, by way of example, that the driver 16 inputting a positive or "yes" answer into the inquiring device 22 to indicate that a child, small child, or baby 18 is present in the vehicle 10, as explained above. The other requirement for activating the device 14 is that one or more predetermined conditions be met.

The predetermined condition, required to activate the alerting device 14, is indicative of a situation where a child 18 may have been mistakenly left in the vehicle. For example, the controller 20 may have a control logic configured to determine whether a predetermined condition has been met that matches a profile defined as a child 18 being left in the vehicle 10.

The predetermined condition can take on a variety of different forms, without falling beyond the spirit and scope of the present invention. In one form, the rear doors 28, 30 includes sensors 32, 34 that are each configured to detect when one of the rear doors 28, 30 is open. The "predetermined condition" which causes the alerting device 14 to be activated can include the controller 20 determining that the vehicle 10 has been turned off, such as by the ignition 36 being turned off, for a shut-off predetermined time frame without a rear door 28, 30 being opened, as detected by one of the rear door sensors 32, 34. The "shut-off predetermined time frame" may be a window of time that must elapse before the controller 20 can activate the alerting device 14. For example, the controller 20 may wait to set off the alerting device 14 until a predetermined time frame has elapsed, such as 2, 5, or 10 minutes. This prevents the alerting device 14 from being activated before the driver 16 has a chance to remove a child 18 from the vehicle 10.

Thus, if the driver 16 leaves the vehicle 10 without opening one of the rear doors 28, 30, the controller 20 will cause the alerting device 14 to produce an alert to notify the driver and/or others that a child may be located in the vehicle 10.

In another example, which could be combined with or separate from the example above, the "predetermined condition" required to set off the alerting device 14 includes the vehicle 10 being parked and locked without first opening one of the rear doors 28, 30 as determined by the rear door sensors 32, 34. In such a case, the controller 20 may not need to wait any shut-off predetermined time frame before activating the alerting device 14, because the controller 20 can programmed to "assume" that once the doors 28, 30, 38 have been locked, the driver 16 is walking away from the vehicle 10 and not retrieving the child 18.

In some variations, the system 12 may include a microphone 42 configured to collect a noise signal 44 from the vehicle 10 after the vehicle 10 has been shut off. For example, the controller 20 may be configured to wait for a predetermined time frame, such as 2, 5, or 10 minutes, and then start collecting a noise signal 44 from within the vehicle 10, through the microphone 42. The controller 20 can then compare the noise signal 44 to a preprogrammed profile 43 of child sounds, which is stored in the controller 20. If the incoming noise signal 44 matches or approximately matches the child sounds profile 43, the controller 20 is configured to activate the alerting device 14, as long as any other predetermined condition(s) are met. The predetermined conditions in this case could include the lapse of the wait period after the vehicle is shut off (so that the alerting device 14 is not activated while the driver 16 is trying to remove the child 18 from the vehicle 10), the ignition switch 36 being shut off (so that the alerting device 14 is not activated while the vehicle 10 is in use), and/or the vehicle 10 being locked.

Thus, the controller 20 may comprise a control logic configured to collect the noise signal 44 from the vehicle 10 after the vehicle or ignition 36 has been shut off. The controller 20 may also have a control logic configured to activate the alerting device 14 when the noise signal 44 matches the predetermined profile of child sounds 43 and when the predetermined condition is met (such as vehicle locked or vehicle shut off for a delay period of time).

In other variations, a camera 48 may be used to detect whether a child 18 has been left behind in the vehicle 10. In such cases, the controller 20 may activate the camera to collect image data 50 from within the vehicle in a predetermined time frame, such as after the vehicle has been shut off for a few minutes, such as 2, 5, or 10 minutes, by way of example; or after the vehicle 10 has been shut off and locked. The controller 20 may then determine that a child 18 is likely present, from the image data 50, and activate the alerting device 14. Thus, the presence of positive image data 50 may constitute the predetermined condition required to set off the alerting device 14. Other examples of predetermined conditions could involve weight sensor data, or infrared sensor data, which can provide a reasonable suspicion that a child 18 has been left behind in the vehicle 10.

In one variation, the alerting device 14 could include a telemetric device that is operable to make phone calls from the vehicle. In such a case, when the controller 20 determines that the alerting device 14 should be activated, the telemetric device makes a phone call to a preprogrammed number, such as the cell phone number of the driver or a parent. In some variations, the telemetric device can activate an associated app on the driver's or parent's cell phone. In some cases, perhaps after additional time has elapsed, the telemetric device could then alert emergency responders (such as OnStar operators) and/or police, so that the emergency responders and/or police can locate the vehicle 10 and make sure the child 18 is safe. In some cases, the OnStar operators (or other emergency responders) may be able to view the interior space 46 in the vehicle 10 through the camera 48 to look for a child 18 left behind.

In some cases, the controller 20 may have a control logic configured to telephone the parent, an emergency responder, and/or police when the alerting device 14 has been activated for the delay predetermined time frame and the child sounds continue to be detected.

In the version having child sound data 44 collected and sent to the controller 40, the controller 20 may then cause the alerting device 14 to use a speaker 52 to broadcast the collected child sounds, preferably very loudly, outside of the vehicle 10. The alerting device 14 may also play an audio message to alert passersby that a small child or baby is alone in the vehicle 10. Accordingly, upon hearing the actual child noises, such as crying, passersby may react and search for the child 18, rather than simply ignoring a standard vehicle alarm noise as folks are accustomed to do. Thus, the controller 20 may have a control logic configured to broadcast the child sounds outside of the vehicle 10 when the child sounds continue to be detected for a delay predetermined time frame.

Figure 4:
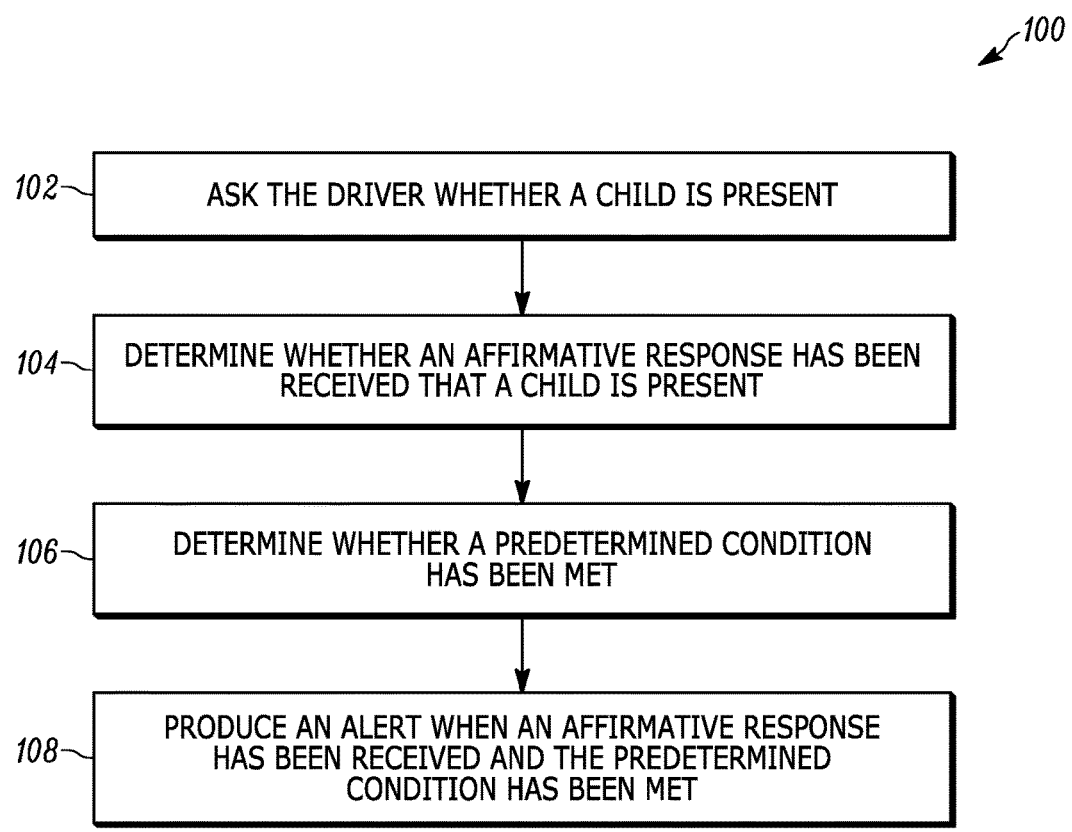
FIG. 4 is a block diagram illustrating a method of reminding a driver of the presence of a child within a motor vehicle, according to the principles of the present disclosure.

Referring now to FIG. 4, a method of reminding a driver of the presence of a child within a motor vehicle is illustrated and generally designated at 100. The method 100 includes a step 102 of asking the driver whether a child is present. The method 100 also includes a step 104 of determining whether an affirmative response has been received that a child is present.

Further, the method 100 includes a step 106 of determining whether a predetermined condition has been met. The predetermined condition may be one that is explained above, where the system is configured to decide that a child have been left behind when one or more predetermined conditions have been met. For example, in some cases, the predetermined condition may be met if at least one of the following occurs: a) the vehicle is turned off for a predetermined period of time without opening a rear door; and b) the vehicle is parked and locked without first opening the rear door.

The method 100 further includes a step 108 of producing an alert when the predetermined condition has been met and the affirmative response has been received. The method 100 may further include collecting a noise signal from the vehicle after the vehicle has been shut off. The method 100 may also include comparing the noise signal with a predetermined profile of child sounds, wherein the predetermined condition is met when the noise signal matches the predetermined profile of child sounds.

A non-transitory machine-readable medium may be provided that provides instructions, which when executed by a machine, cause the machine to perform operations, such as the method 100. For example, the operations may include asking the driver whether a child is present, determining whether an affirmative response has been given that a child is present, determining whether a predetermined condition has been met, and activating an alert when the predetermined condition has been met.

The system 12 may be an add-on to existing components so that no additional hardware is required.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A child-on-board alerting system for an automotive vehicle, the child-on-board alerting system comprising:
an alerting device configured to produce an alert;
a controller controllably coupled to the alerting device, the controller being operable to activate the alerting device to produce the alert; and
an inquiring device communicatively coupled to the controller, the inquiring device being configured to ask the driver whether a child is present;
wherein the controller is configured to activate the alerting device to produce the alert when a predetermined condition is met and the controller has received an affirmative response to the inquiring device;
the system further comprising a rear door sensor configured to detect whether a rear door is open;
wherein the predetermined condition includes at least one of the following: a) the vehicle being turned off for a shut-off predetermined time frame without a rear door being opened as detected by the rear door sensor; and b) the vehicle being parked and locked without first opening the rear door as detected by the rear door sensor;
the inquiring device being reconfigurable between the following modes:
an always ask mode wherein the inquiring device is configured to ask whether a child is present upon turning on the vehicle;
a sensor ask mode wherein the inquiring device is configured to ask whether a child is present when at least one of the following occurs in a start-up predetermined time frame:
a) the rear door is opened prior to opening a front door,
b) the rear door is opened prior to starting the vehicle, and c) the rear door is opened prior to engaging a drive gear of the vehicle; and a never ask mode wherein the inquiring device is configured to refrain from asking whether a child is present.

2. The child-on-board alerting system of claim 1, the inquiring device comprising an interactive display configured to display a question asking the driver whether a child is present, the interactive display being configured to receive an answer to the question and provide the answer to the controller.

3. A controller for implementing a child-on-board reminder system in a motor vehicle, the controller comprising:

a first control logic configured to ask a driver whether a child is present in the vehicle;

a second control logic configured to determine whether a predetermined condition has been met that matches a profile defined as a child being left in a vehicle;

a third control logic configured to activate an alerting device when the predetermined condition has been met and the controller has received an affirmative response to the first control logic;

wherein the predetermined condition includes at least one of the following: a) the vehicle being turned off for a shut-off predetermined time frame without a rear door being opened as detected by the rear door sensor; and b) the vehicle being parked and locked without first opening the rear door as detected by the rear door sensor; and further comprising a fourth control logic configured to determine whether a rear door has been opened prior to opening a front door and starting the vehicle, in a start-up predetermined time frame.

4. The controller of claim 3, wherein the controller is reconfigurable between the following modes: an always ask mode wherein the controller is configured to activate the first control logic upon turning on the vehicle; a sensor ask mode wherein the controller is configured to activate the first control logic when, in a start-up predetermined time frame, at least one of the following occurs: the rear door is opened prior to opening a front door, the rear door is opened prior to starting the vehicle, and the rear door is opened prior to engaging a drive gear of the first control logic.

* * * * *